(12) United States Patent
Lee et al.

(10) Patent No.: US 7,372,927 B2
(45) Date of Patent: May 13, 2008

(54) DIGITAL FILTER FOR SOFTWARE-DEFINED RADIO SYSTEM, DIGITAL INTERMEDIATE FREQUENCY SIGNAL PROCESSING APPARATUS HAVING THE DIGITAL FILTER, AND METHOD THEREOF

(75) Inventors: Sang-Hyun Lee, Busan (KR); Kwang-Soon Kim, Daejeon (KR); Yun-Hee Kim, Daejeon (KR); Kyung-Hi Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 837 days.

(21) Appl. No.: 10/606,822

(22) Filed: Jun. 26, 2003

(65) Prior Publication Data

US 2005/0032480 A1    Feb. 10, 2005

(30) Foreign Application Priority Data

Dec. 12, 2002   (KR) ...................... 10-2002-0079230

(51) Int. Cl.
*H04B 1/10* (2006.01)
(52) U.S. Cl. ..................................... 375/350
(58) Field of Classification Search ................ 375/316, 375/346, 350, 130, 147
See application file for complete search history.

(56) References Cited

U.S. PATENT DOCUMENTS 5,909,384 A *    6/1999    Tal et al. .................... 708/322
6,304,301 B1 *  10/2001    Goeckler ..................... 348/723
6,678,317 B1 *   1/2004    Murakami et al. ........... 375/232
7,110,732 B2 *   9/2006    Mostafa et al. .............. 455/130
2003/0072320 A1 * 4/2003   Seo et al. .................... 370/441

FOREIGN PATENT DOCUMENTS

| KR | 10-1997-017286 | 5/1997 |
| KR | 1019990026632 | 7/1999 |
| WO | PCT/US98/23216 | 11/1998 |

\* cited by examiner

*Primary Examiner*—Kevin Burd
(74) *Attorney, Agent, or Firm*—Blakely, Sokoloff, Taylor & Zafman LLP

(57)    ABSTRACT

Disclosed is a receiver digital filter for a digital IF signal processor suitable for the specification of each communication standard in a communication system that supports at least one communication standard. The filter for each standard is constructed as one block, and includes a block for externally implementing the constructed block. The coefficient of the digital filter constructed in one block is implemented with an external input or an internal filter coefficient calculator by a basic filter building block. In this manner, the common resources required in the digital filter used in each communication standard are shared, and only the additionally required resources are selectively implemented. Since the shared resources are calculated by dynamic programming, a considerably smaller number of additional resources are required.

20 Claims, 10 Drawing Sheets

DIGITAL FILTER FOR SOFTWARE-DEFINED RADIO SYSTEM, DIGITAL INTERMEDIATE FREQUENCY SIGNAL PROCESSING APPARATUS HAVING THE DIGITAL FILTER, AND METHOD THEREOF

CROSS REFERENCE TO RELATED APPLICATION

This application is based on Korea Patent Application No. 2002-79230 filed on Dec. 12, 2002 in the Korean Intellectual Property Office, the content of which is incorporated herein by reference.

BACKGROUND OF THE INVENTION (a) Field of the Invention

The present invention relates to a physical hierarchical technology for software-defined radio systems. More specifically, the present invention relates to a digital filter for software-defined radio systems, a digital intermediate frequency signal processing apparatus having the digital filter, and a method thereof that supports multiple communication standards.

(b) Description of the Related Art

With the advance of integrated circuit (IC) technology, the performance of digital signal processing has been enhanced with a reduced cost, while expanding digital signal processing areas in the design of modems as well as digital communication/processing areas in a communication system.

Among the digital communication/processing areas, digital transmitter/receiver filters effectively restrain the band of signals, form signal waveforms, and prevent inter-channel interference from adjacent channels to minimize inter-symbol interference, i.e., distortion caused by an overlap of signal waveforms.

The recent enhancement of IC technology has realized the digitalization of a transmitter/receiver filter, which is implemented by a method of using a Nyquist filter causing no inter-signal interference at the receiver as one stage, or a method of dividing the filter into a transmitter filter and a receiver filter and using the filters as two stages.

More specifically, in the former method, the Nyquist filter designed by Nyquist for the first time can be readily designed as a finite impulse response (FIR) filter having a linear phase. The latter method has a problem with complicated design in that calculations of the transmitter and receiver filters must be performed simultaneously, while satisfying a Nyquist condition that there must not be inter-symbol interference (ISI) to the multiplication of the frequency responses of the two filters.

The linear phase FIR filter has a symmetric time-domain impulse response to reduce a cost of implementation by half, and halves the number of coefficients to be calculated in design to reduce the required time for calculations. With a frequency-based group delay regularly given due to a characteristic of the linear phase, the linear phase FIR is advantageous in symbol synchronization in digital communication systems and relatively so in non-linear distortion. The FIR filter, if implemented by VLSI (Very Large Scale Integrated) technology, has a structure basically comprised of multipliers and summators. But the use of multipliers in high-speed application systems is not desirable in the aspect of both complexity and speed.

There is no flexibility for multipliers in ASIC (Application Specific Integrated Circuit) of digital filters for a specific application. So, the filter coefficient is desirably designed to have a discrete coefficient representation for the sake of a simpler coefficient implementation.

The filter coefficient having a discrete coefficient representation, particularly comprised of a summation of power-of-2 ($\frac{1}{2}^N$) coefficients, is simply implemented with summations and shifts, reducing a cost of hardware and avoiding a frequency response distortion caused by coefficient quantization.

On the other hand, an efficient VLSL implementation can also be achieved for the transmitter/receiver filter divided into transmitter and receiver by using a discrete coefficient. Generally, the linearity gives an optimal solution of the problem in the design of a filter having a discrete coefficient. But this develops to a problem of non-linear optimization that must be solved using various combination-optimizing algorithms for a problem having a discrete solution.

The basic concept of the software-defined radio (hereinafter referred to as "SDR") system using the digital filters implies a radio system that drives all the functions of the communication system other than antennas completely in software to reconstruct all the communication functions. It is the object of the system of this category to introduce an open structure concept such as a computer to make the respective components of the transceiver into modules and define the interface between the modules in software, thereby implementing multi-standard communication equipment simply by replacement of software for the respective communication standards.

Digitalization is performed at a position nearest to the antenna, and all the protocol stacks including a physical layer are defined in software to enable a multi-band/multi-mode communication system. The basic hardware necessary for the implementation includes a wideband analog RF (Radio Frequency) front-end and a general digital processor reconfigurable with a high processing speed. For IF (Intermediate Frequency) processing of a digitalized signal, a digital down-converter is used at the RF end to convert the digital signal to a baseband signal. A receiver filter is a very important part of the digital down-converter, and must be reconfigurable for the respective communication standards according to the basic concept of SDR.

The SDR system of this characteristic, which is based on a terminal for supporting multiple communication standards, must include all resources for supporting the respective standards.

It is, however, undesirable to include all hardware for the respective standards in the aspect of high cost and complexity. To solve this problem, digital signal processing (DSP) is of great importance in the SDR system. The introduction of DSP leads to improved flexibility and performance of the SDR system, relative to the existing analog technology. Namely, a digital intermediate frequency signal processor is necessary because reconfiguration must be guaranteed for RF, IF, and baseband in order to implement the physical layer of the SDR system.

A technology related to the digital intermediate frequency signal processing is disclosed in Korean Patent No. 10-1999-26632 patented by Hyundai Electronics Industries Co., Ltd. under the title of "Intermediate frequency sharing dual mode mobile terminal", which defines frequencies to share frequency mixers and share a band-pass filter and an intermediate frequency processor, thereby implementing an analog intermediate frequency processor in a small size.

SUMMARY OF THE INVENTION

It is an advantage of the present invention to solve the above-mentioned problems and to provide a digital filter for an SDR system, a digital intermediate frequency signal processing apparatus having the digital filter, and a method thereof that implements a digitalized receiver filter reconfigurable with a least quantity of hardware to share hardware resources and that reduces the total cost of hardware of the digital transceiver filter by sharing a most quantity of hardware.

It is another advantage of the present invention to provide a digital intermediate frequency signal processing apparatus having the digital filter, and a method thereof that minimizes a filter structure including a method of calculating filter coefficients using combination optimizing algorithms for designing a linear phase FIR receiver filter having a discrete coefficient, and a cost for calculating the configuration of a digital transceiver filter in conformity with the respective communication standards.

In one aspect of the present invention, there is provided an apparatus for processing a digital intermediate frequency signal in a software-defined radio system, which is driven by software, the apparatus including: a digital frequency mixer for, upon receiving a digitalized intermediate frequency signal, converting the received intermediate frequency signal to a baseband signal; a receiver filter for removing a high-band signal from the converted baseband signal; a receiver filter building block for controlling implementation of the receiver filter to support multiple communication standards; an implementation controller for controlling an implementation of the receiver filter building block; and a filter coefficient calculator for receiving information about a specification of the receiver filter from the implementation controller, calculating a coefficient of the receiver filter using the received information, and providing the calculated coefficient of the receiver filter to the implementation controller.

In another aspect of the present invention, a digital filter is provided that includes: a multiplexer for supporting filter coefficients for multiple communication standards simultaneously; a filter coefficient multiplier for multiplying the coefficients; a register corresponding to an order; and a summator for performing an operation. The digital filter is constructed to share common resources according to the multiple communication standards, and select additionally required resources other than the shared resources by a switching operation.

In further another aspect of the present invention, there is provided a method for processing a digital intermediate frequency signal in a software-defined radio system, which is driven by software, the method including: (a) converting a digitalized intermediate frequency signal to a baseband signal, upon receiving the intermediate frequency signal; (b) removing a high-band signal from the converted baseband signal; (c) controlling implementation of a receiver filter performing the step (b) to support multiple communication standards; (d) calculating a coefficient of the receiver filter using information about a specification of the receiver filter, upon receiving the information from an implementation controller for controlling implementation of a receiver filter building block performing the step (c); and (e) providing the calculated coefficient of the receiver filter to the implementation controller.

In a still further aspect of the present invention, there is provided a recording medium with a built-in program, which recording medium includes a digital intermediate frequency signal processing method for a software-defined radio system driven by software, the program including: (a) a function of converting a digitalized intermediate frequency signal to a baseband signal, upon receiving the intermediate frequency signal; (b) a function of removing a high-band signal from the converted baseband signal; (c) a function of controlling implementation of a receiver filter performing the function (b) to support multiple communication standards; (d) a function of calculating a coefficient of the receiver filter using information about a specification of the receiver filter, upon receiving the information from an implementation controller for controlling an implementation of a receiver filter building block performing the function (c); and (e) a function of providing the calculated coefficient of the receiver filter to the implementation controller.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention.

Accordingly, the drawings and description are to be regarded as illustrative in nature, and not restrictive.

Figure 1:
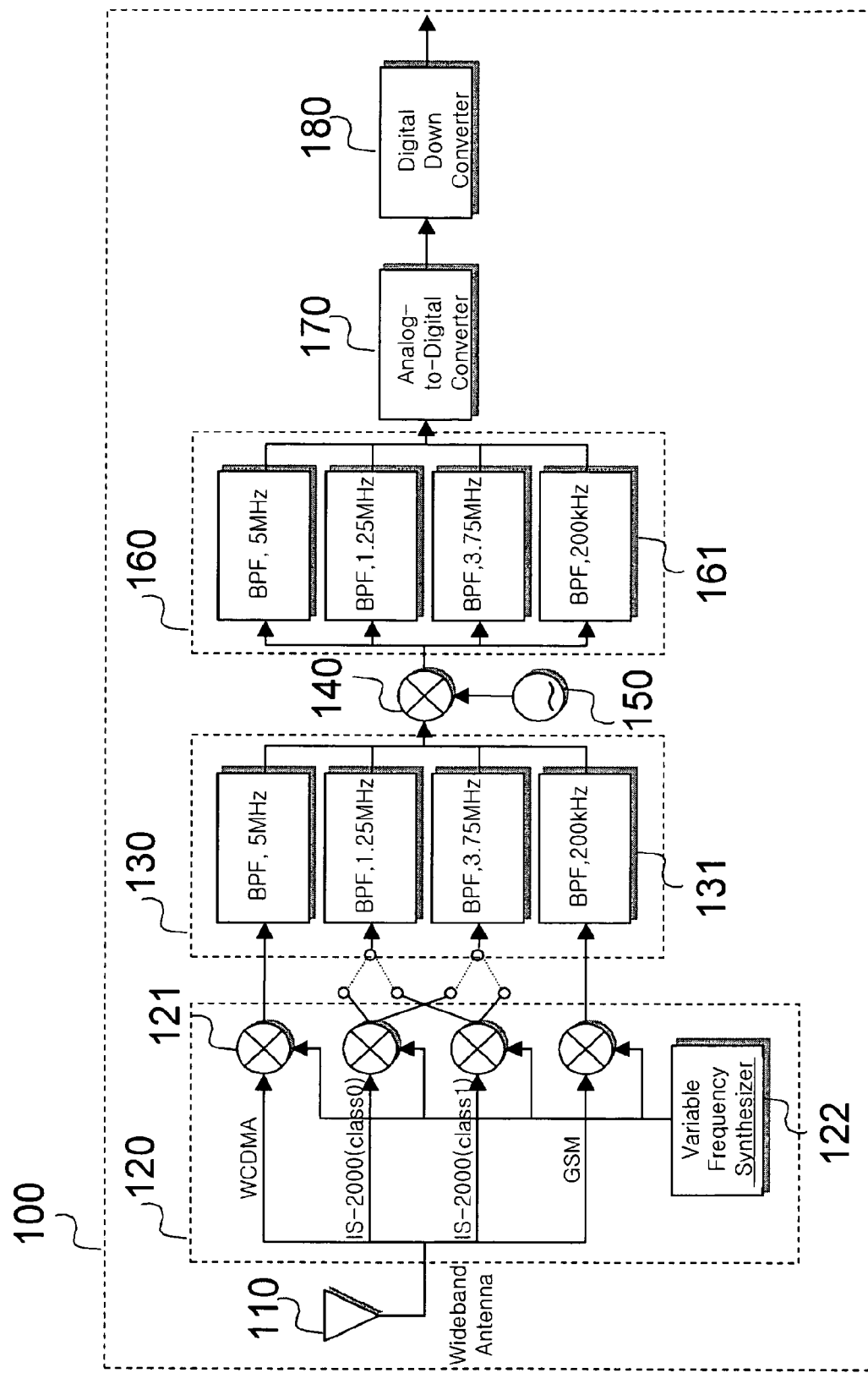
FIG. 1 is a schematic diagram showing the structure of an RF/intermediate frequency processor in the receiver of a communication system supporting multiple communication standards.

FIG. 1 is a schematic diagram showing a front-end structure 100 in a receiver for supporting multiple standards in accordance with an embodiment of the present invention.

As for personal user terminals, economy in cost and reduction of complexity are quite significant in signal processing after an antenna, so that digital down-conversion is adapted. The front-end structure includes a wideband antenna 110 for receiving multi-standard RF signals; frequency mixers 120, 140, and 150 for converting different RF bands of the received signals to a common band; and band-pass filters 130 and 160 of different types used according to the bandwidth of the received signals.

The front-end structure 100 of FIG. 1 is provided in the receiver of a system that supports multiple standards, including the asynchronous third-generation mobile communication standard, 3GPP (Third-Generation Partnership Project); the synchronous third-generation mobile communication standard, 3GPP2 (Third-Generation Partnership Project 2); the presumably 2.5-generation CDMA (Code Division Multiple Access) mobile communication standard, IS-95; and the European TDMA (Time Division Multiple Access) mobile communication standard, GSM (Global System Mobile).

Transceiver filters must be provided by the respective standards. For 3GPP, for example, a root-raised cosine filter given in the standard can be designed by the coefficient representation method in terms of powers of 2. For both IS-95 and 3GPP2, the digital filter of IS-95 can be used, because 3GPP2 having a wideband signal adapts an IS-95 receiver filter so as to satisfy backward compatibility.

As for 3GPP2 in the 3X mode using three multi-carriers, the same filter can be used as before by an interpolation method.

In the aspect of technique, RF usually operates in an analog range and it is difficult for RF to have a flexible structure operating in an analog range. So, digital conversion is carried out right before the IF end to support a digital down-converter 180. A standardized frequency must be determined that simplifies digital signal processing during the digital down-conversion. Preferably, the standardized frequency is four times higher than the intermediate frequency as expressed by the following equation 1, thus simplifying the structure of the digital frequency mixer. Namely, the value of the sinusoidal function is confined to −1, 0, or 1, which eliminates a need for using a multiplier.

$$f_s = 4 \times f_{IF}$$ [Equation 1]

Figure 2:
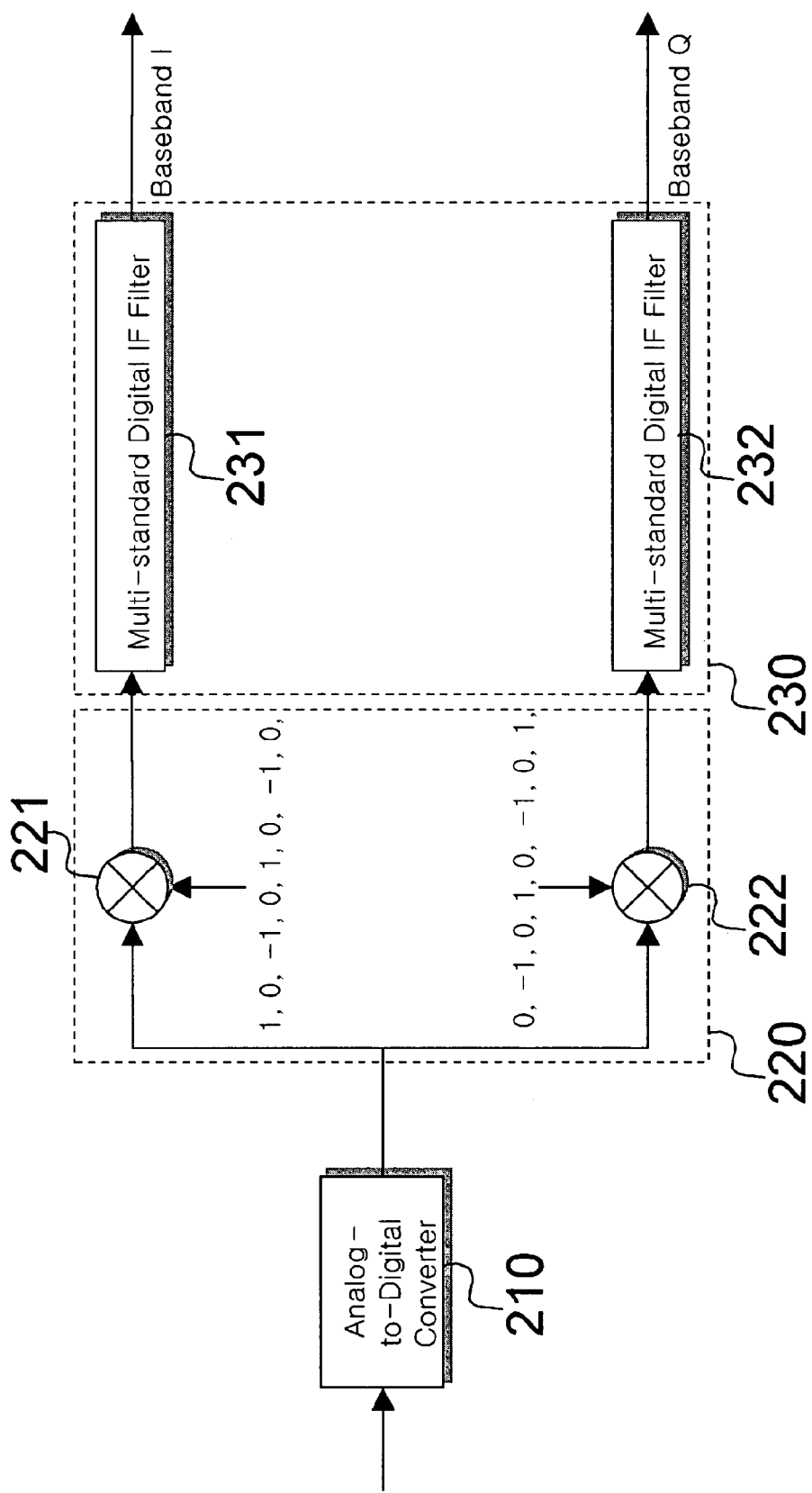
FIG. 2 is a diagram showing the structure of a digital intermediate frequency processor and a digital down-converter of the receiver of the multi-standard communication system.

FIG. 2 is a detailed diagram of the digital down-converter 180 constructed according to the equation 1.

From the equation 1, a digital frequency synthesizer 220 for multiple down-conversions is changed to a simple construction so that multiplier 221 is replaced with simple switches and a sign converter. Then, a multi-standard transceiver filter must be optimized. The problem related to the implementation of the physical layer in SDR technology is that the programmability of hardware must be maximized. For that reason, a FIR filter is preferably used for simply implementing the digital filter and reducing the difference in performance of the digital filter between a theoretical calculation and an actual implementation.

The FIR filter, if designed as a linear phase filter, not only has functional characteristics such as ease of compensation of distortion occurring on channels and a guarantee of stability, but it also employs a symmetrical structure or a technique of time multiplexing of hardware, thus providing regularity of implementation such that the digital filter can be implemented with a defined building block.

The structure for implementing the FIR filter is considered for a transceiver filter. The received signals for the respective standards allowed for a multi-standard receiver pass through IF receivers filter specifically designed for the respective standards. Each filter has a different specification according to the standard, so there is a tendency that the length or distribution of the filter coefficient is slightly different from standard to standard. Designing filters independently by the respective standards leads to an inefficient structure in that the receiver must include all necessary hardware. Thus there is a demand for supporting all specifications at a lowest cost as possible.

Figure 3:
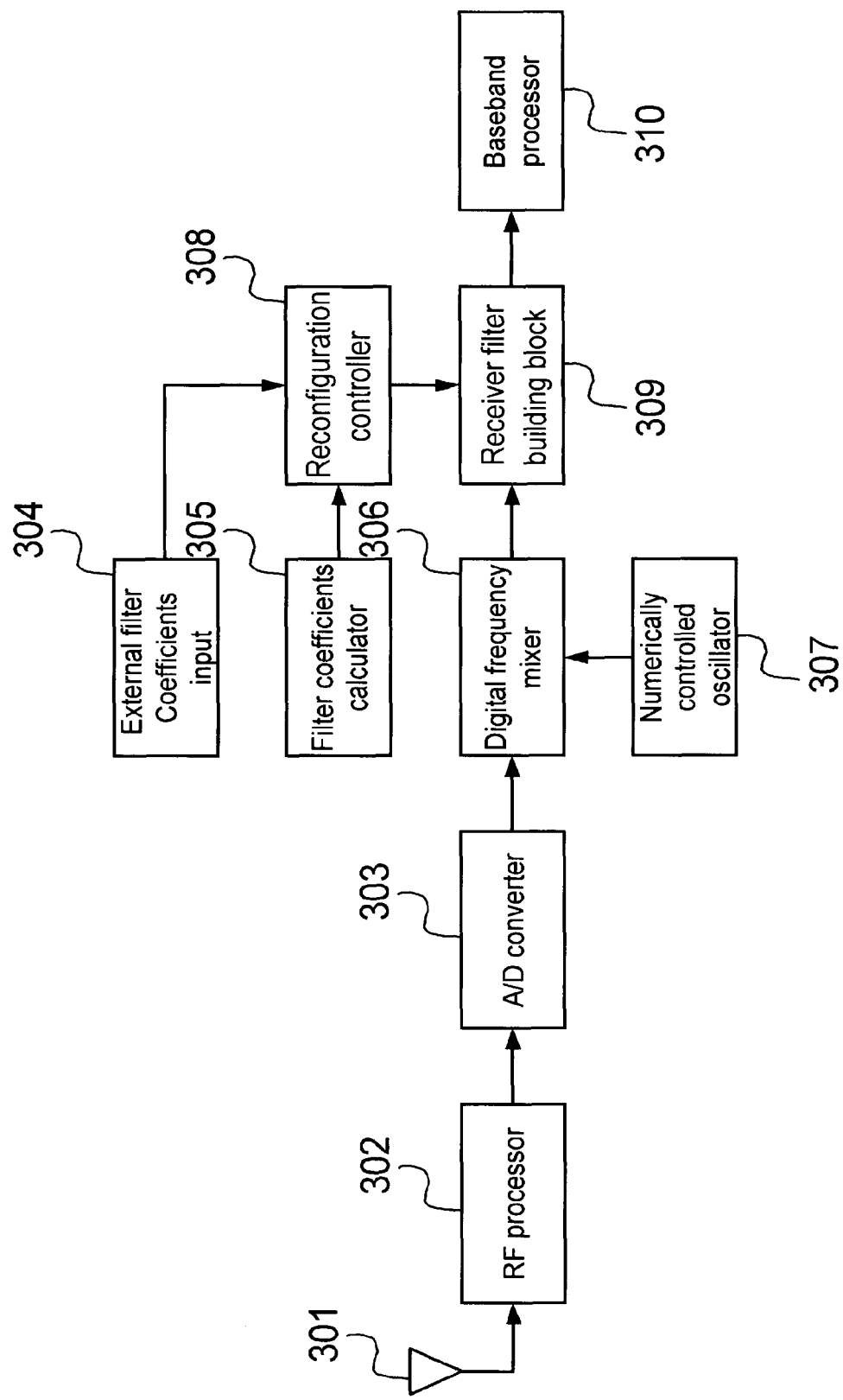
FIG. 3 is a schematic diagram showing the structure of a receiver digital filter of a digital intermediate frequency signal processing apparatus according to an embodiment of the present invention.

FIG. 3 is a schematic diagram showing the structure of a receiver digital filter of a digital intermediate frequency signal processing apparatus according to the embodiment of the present invention.

Referring to FIG. 3, the receiver digital filter of the digital intermediate frequency signal processing apparatus according to the embodiment of the present invention comprises an antenna 301, an RF signal processor 302, an analog-to-digital converter 303, an external filter coefficient input 304, a filter coefficient calculator 305, a digital frequency mixer 306, a numerically controlled oscillator 307, a reconfiguration controller 308, a receiver filter building block 309, and a baseband processor 310.

Next, the receiver digital filter of this structure will be described in detail as follows. The received signal from the antenna 301 is converted to an analog IF signal through the RF signal processor 302 that includes, in one block, the first RF down-converter 120, the first RF analog filter 130, the second RF down-converter 140, the second down-conversion oscillator 150, and the second RF analog filter 160 of FIG. 1.

The converted signal is digitalized at the analog-to-digital converter 303, and converted to a baseband signal at the digital frequency mixer 306 that has a characteristic of the simplified frequency mixer 202 of FIG. 2. The digital frequency mixer 306 receives an input signal from the numerically controlled oscillator 307 that calculates the value of a sinusoidal function of digital frequencies. The receiver filter 309 for removing a high-band signal from the converted baseband signal is provided in the form of a basic building block characterized by the multi-standard structure 230 of FIG. 2, and can be implemented by a control signal input from the reconfiguration controller 308 responsible for instructing hardware configuration.

The reconfiguration controller 308 is designed to receive a filter coefficient from the filter coefficient calculator 305 so as to send the received filter coefficient to the receiver filter 309, and is enabled to receive an input from the external filter coefficient input 304 for receiving the coefficient filter directly from an external input.

Finally, the receiver digital filter suggested by the present invention comprises external filter coefficient input 304, filter coefficient calculator 305, digital frequency mixer 306, numerically controlled oscillator 307, reconfiguration controller 308, and receiver filter building block 309.

Figure 4:
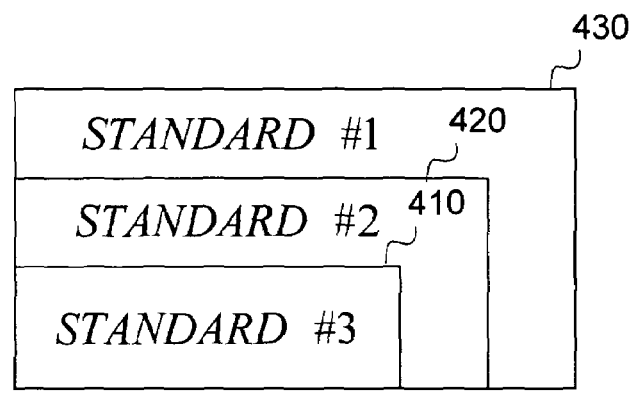
FIG. 4 is a diagram for explaining a method for the reconfiguration controller of FIG. 3 implementing a receiver filter building block.

FIG. 4 is a diagram explaining an implementation method of the receiver filter building block 309 under the control of the reconfiguration controller of FIG. 3. In FIG. 4, the principle of sharing filters required by the respective standards is illustrated.

The receiver filters are each designed in conformity to its specification to have a different length from each other. Therefore, the cost of hardware varies depending on the type of the receiver filter. But a longest filter 430 requires the most resources, which are necessary for the receiver to support a corresponding communication standard. An approach that can be considered to reduce the total cost of filter hardware is sharing common resources by including short filters 410 and 420 having a relatively small length in the long filter 430 so that the short filters use the resources of the long filter 430. Accordingly, the embodiment of the present invention provides the structure of the digital filter of FIG. 4 for different standards.

Figure 5:
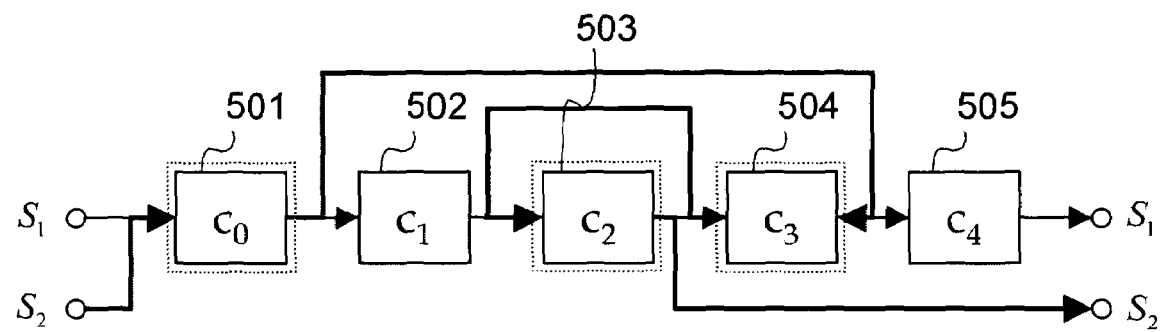
FIG. 5 is a diagram showing an example of the multi-standard receiver digital filter structure erroneously constructed according to a wrong structural concept.

FIG. 5 is a diagram showing a wrong configuration possibly occurring when the principle of FIG. 4 is erroneously applied. In a sharing method of including the coefficients of a short filter in a long filter, the total number of cases is $N_{long}!/(N_{long}-N_{short})!$, where $N_{long}$ represents the length of the long filter, and $N_{short}$ represents the length of the short filter.

This method, in which a changeover in the order of the coefficients of the short filter is allowed, may minimize a cost of hardware, but causes a need of calculating the coefficients of the short filter in a different order from the long filter.

In FIG. 5, blocks 501 to 505 denoted by $c_i$ represent basic building blocks for calculating the coefficient of the long filter $S_1$ and blocks 501, 503, and 504 surrounded by a dotted line represent basic building blocks for the short filter $S_2$. The solid line represents a path of signals for the short filter $S_2$. This is not a suitable method, because the signals processed at the ending part return to the leading part in FIG. 5 to lose normality in implementation of the data bus.

Figure 6:
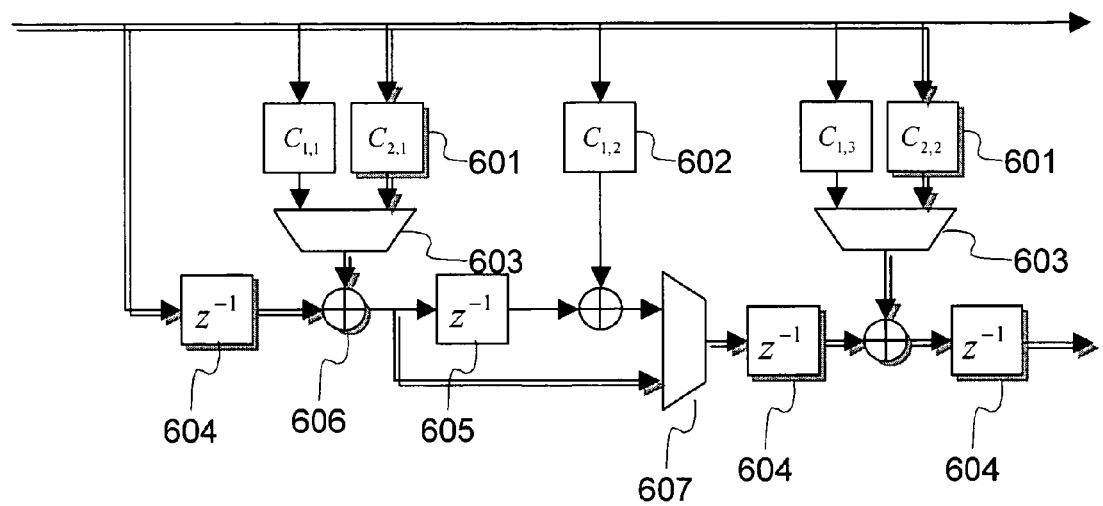
FIG. 6 is a schematic diagram showing the resource-shared structure of a digital filter according to the embodiment of the present invention.

FIG. 6 shows the resource-shared structure of the digital filter according to the embodiment of the present invention. Here, the above-described constrained condition can be added such that the order of the coefficients of the short filter $S_2$ cannot change over in sharing the coefficients of the short filter. This structure prevents a phenomenon such that the digital filter passes through a higher-order coefficient and then a lower-order coefficient.

More specifically, the basic building block of each filter implemented under the constrained condition comprises filter coefficient multipliers 601 and 602, register memories 604 and 605 corresponding the respective orders of the filters, a summator 606 for performing an operation of the filters, and a multiplexer MUX 603 for supporting filter coefficients of different standards simultaneously.

As shown in FIG. 6, the unshaded parts 602, 605, and 606 in the basic building block are resources used only for the long filter, and the shaded parts 601 and 604 are resources used for the short filter. The multiplexer 603 selects the configuration of the filter for one of the standards under the control of an implementation controller.

The calculation of filter coefficients can be implemented by sharing resources, so multiplexer 607 is used for the inconsecutive coefficients of the long filter to which the coefficients for the two consecutive orders of the short filter are allocated. Namely, the multiplexer 607 is used when the short filter does not need the register 605.

As a result, additional hardware for the multiplexer is used. But, when the saved quantity of hardware acquired by sharing resources for coefficient calculation exceeds at least one summator, economy of hardware is actually achieved because the cost of the summator is approximately two to four times as high as that of the multiplexer.

The structure of the multi-standard receiver filter suggested in the present invention is illustrated in FIG. 6. The principle of implementing the IF signal receiver filter according to the present invention can be summarized as follows. But the present invention is not limited to this embodiment and the principle can be summarized according to another principle of implementation.

More specifically, all the filters are designed as an FIR filter having a discrete coefficient and are made reconfigurable. Each filter coefficient has a basic building block that is comprised of a summation or a difference of power-of-2 terms, implemented with shifts and summations, they share shift and summation resources of a common coefficient, and they implement all coefficients irrespective of the standard by an addition of some summations and shifts. Based on this principle, the coefficients of the short filter are allocated to the coefficient of the long filter so as to maximize the number of sharable resources. The coefficients of the filters constructed as above additionally have an optional function, such as a multiplexer, to operate according to each standard, and they associate the respective filters to perform a normal operation according to an instruction of the implementation controller.

Under the constrained condition that the implementation order of filter coefficients cannot change over, the total number of cases of coefficient allocation is $N_{long}!/\{N_{short}!(N_{long}-N_{short})!\}$.

It is, however, apparent that the number of cases is much increased arithmetically when the general FIR filter is about 60 to 200 long enough and the difference in length between the two filters of a different standard is greater than 10.

Thus the searching of all cases is actually impossible to achieve, or if possible, it requires a considerably high calculation load, causing a demand for using an implementation controller having a method of effectively performing the searching process.

Figure 7:
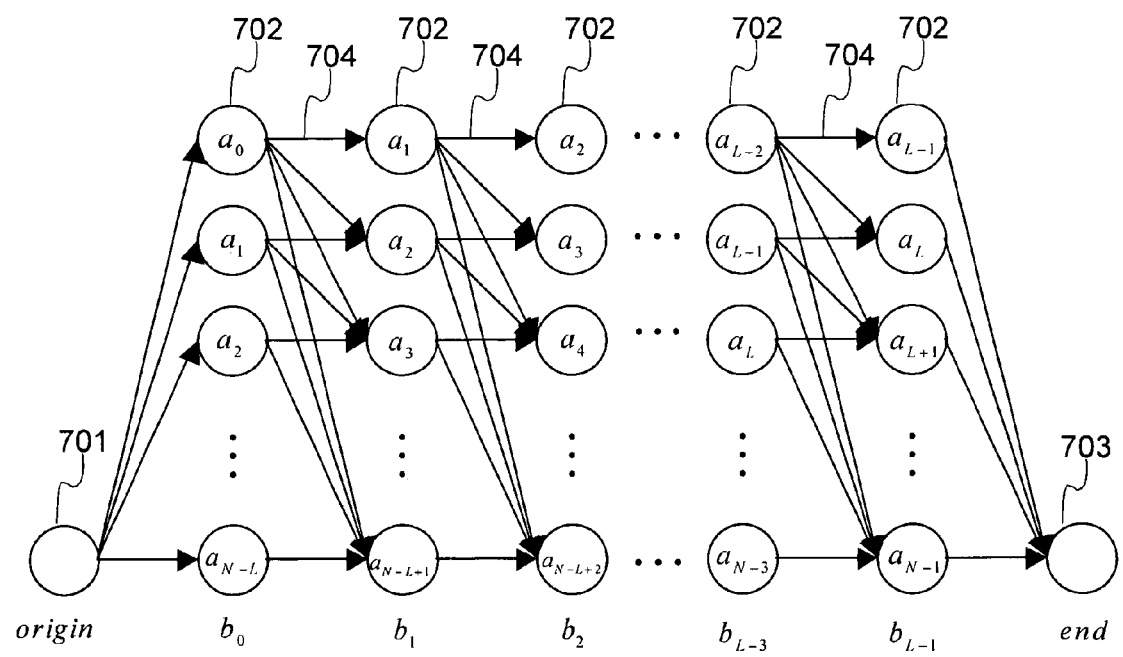
FIG. 7 is a diagram showing a trellis necessary for calculations to implement a basic block with an implementation structure of the receiver digital filter according to the embodiment of the present invention.

FIG. 7 is a trellis diagram necessary for applying a coefficient allocation method including an implementation controller according to the embodiment of the present invention.

For resource distribution such as an adequate distribution of resources of filter coefficients, a dynamic programming method is used. The coefficient allocation method under the constrained condition that the order of coefficients cannot change over, in FIG. 6, is problematic from the standpoint of the dynamic programming method. To perform the dynamic programming method, a trellis must be constructed. A method for constructing a trellis is illustrated in FIG. 7.

In FIG. 7, $b_n$ represents the coefficient of the short filter, L the length of the short filter, $a_n$ the time response of the long filter, N the length of the long filter.

Each stage of the trellis represents a step of allocating each coefficient of the short filter, and status 702 for each stage represents the coefficient of the long filter to which the coefficients of the short filter can be allocated.

For example, when the length of the short filter is 3 and that of the long filter is 5 under a constrained condition that the order of coefficients cannot change over, the first coefficient of the short filter is allocated to the first, second, and third coefficients of the long filter. Otherwise, some of the other coefficients of the short filter cannot be allocated to the long filter.

Hence, the order of the coefficient of the long filter to which the first coefficient of the short filter is allocated is 0 to N−L, and the i-th coefficient of the short filter is generally allocated to the coefficient of the long filter having an order of i to N−1+i. This method defines all the statuses 701, 702, and 703 of the trellis.

After the status definition, cases 704 must be defined. The i-th status in each stage has i cases. This is because when the second coefficient of the short filter is allocated to the third coefficient of the long filter, the first coefficient of the short filter can be allocated only to the first and second coefficients of the long filter. The result is the trellis of FIG. 7.

Figure 8:
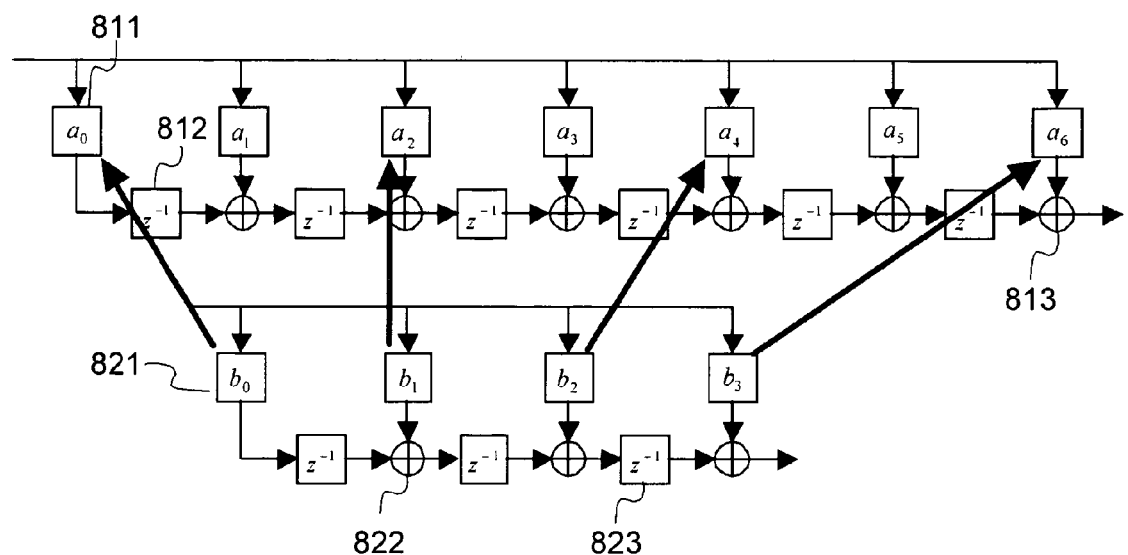
FIG. 8 is a diagram showing the result of an implementation method using the trellis of FIG. 7 according to the coefficient allocation principle of FIG. 6.

FIG. 8 shows the result of the implementation method using the trellis of FIG. 7 based on the coefficient allocation principle of FIG. 6.

In FIG. 8, the individual coefficients of the short filter are sequentially allocated to the first, third, fifth, and seventh coefficients of the long filter. The coefficients thus allocated are disassembled into a basic building block for calculating the respective coefficients and divided into a sharable part and an unsharable part, which are made as a selectable structure by the addition of a multiplexer.

Figure 9:
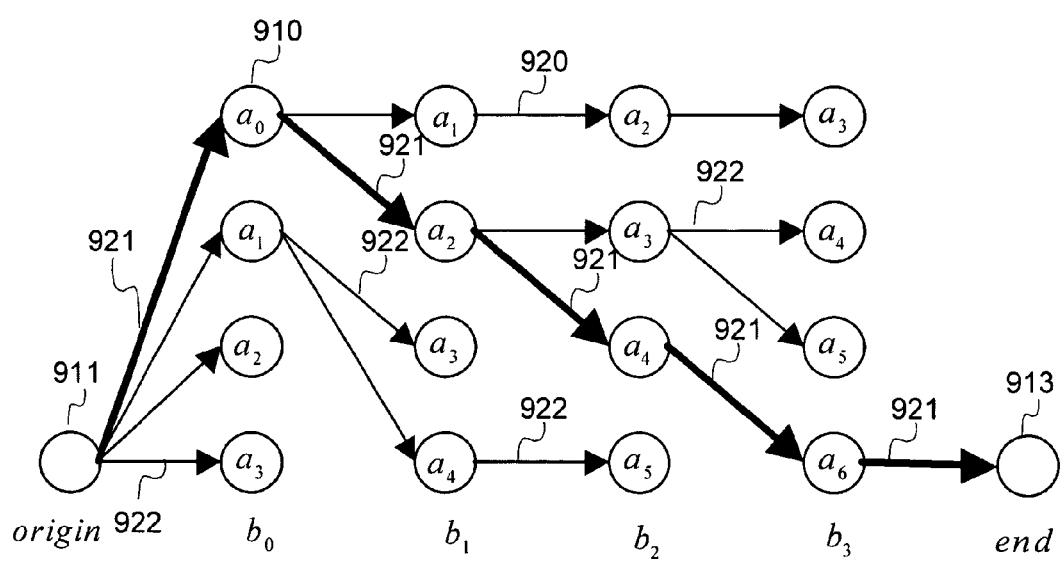
FIG. 9 is a diagram showing a calculation method for the configuration method of FIG. 8 using a trellis.

FIG. 9 is a diagram showing an example of a searching process performed in obtaining the result of FIG. 8 by the dynamic allocation method using the trellis of FIG. 7, in which the searching process is based on dynamic programming.

More specifically, the dynamic programming is a method of allocating resources in steps, removing branches 920 for candidates unlikely to achieve optimized resource allocation, and allocating a smallest number of resources in a final allocation pattern. Searching starts from an origin 911 having no resource allocated. Branches 921 and 921 having a smallest number of resources for the respective statuses 910 are retained, with the other branches cut off. The status at each branch 921 denoted by the solid line as obtained in the above-described way corresponds to the coefficient of the long filter to which the coefficients of the short filter are allocated. The cost for each branch is the last thing to determine so as to perform searching after the trellis of FIG. 7 is constructed. The trellis in which each cost is defined is illustrated in FIG. 10.

Figure 10:
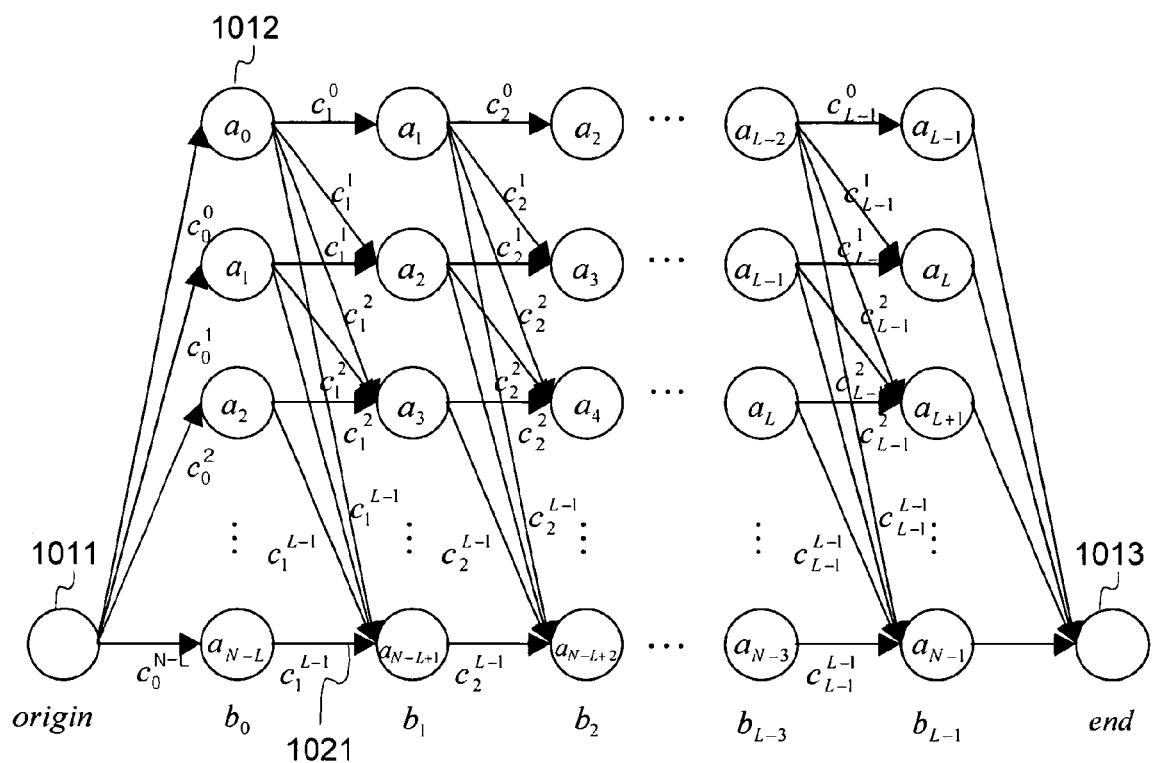
FIG. 10 is a diagram of the trellis finally defined for the suggested coefficient calculation method.

FIG. 10 shows the structure of a trellis in which a cost function is finally defined, where the defined cost $c_i^j$ represents a cost function required for a transition of the i-th coefficient of the short filter to the j-th status of the next stage.

Thus, all the paths in each status of a stage represent a same allocation method, and the branch costs are all equal. In each stage, the survivor can be determined by observing the total path cost until the status prior to the status transition, reducing the amount of calculations relative to general dynamic programming.

Figure 11:
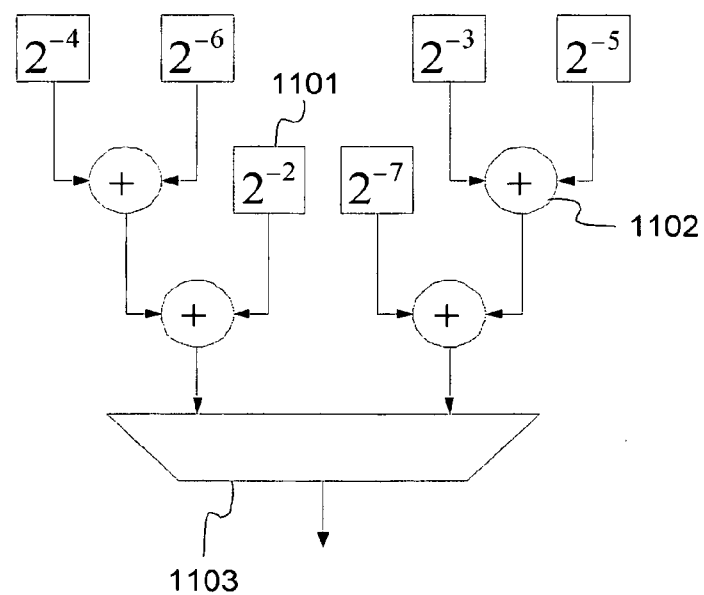
FIGS. 11, 12, and 13 are diagrams showing a method for defining an actual cost using the cost function given as $c_i^j$ of FIG. 10.
Figure 12:
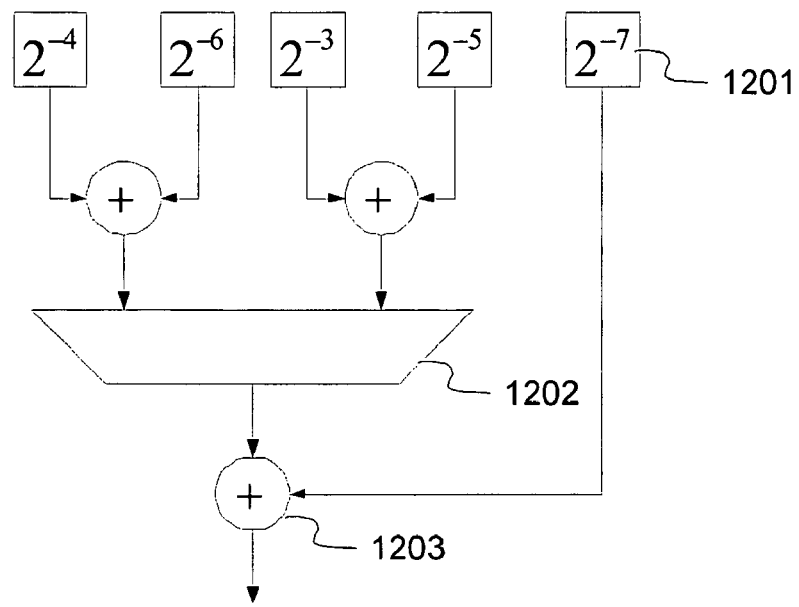
Figure 13:
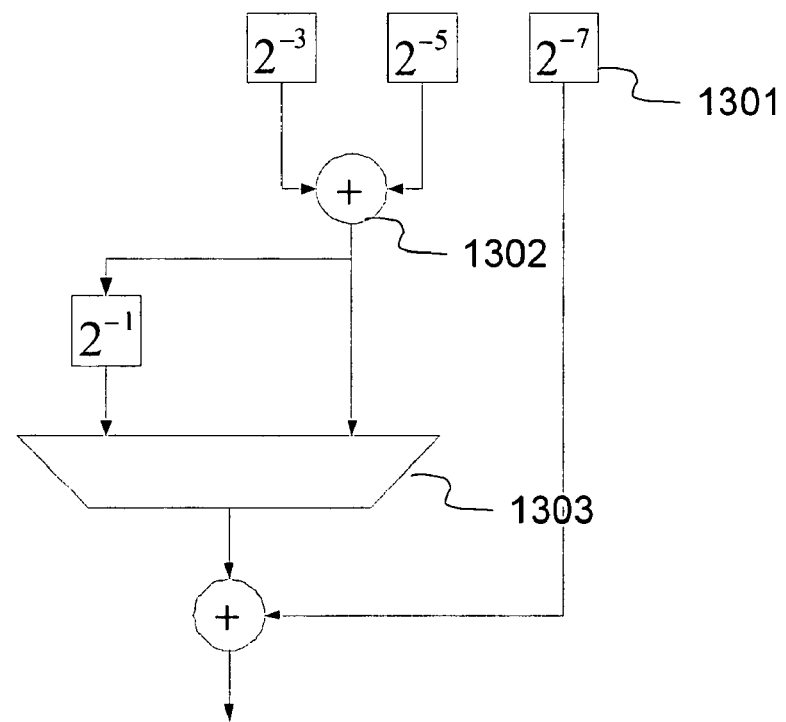

FIGS. 11, 12, and 13 illustrate an actual cost definition method using a cost function given as $c_i^j$ of FIG. 10.

For two filters not combined together, the total cost of hardware minus the cost of hardware required to implement the coefficients of the two filters is the saved cost of hardware acquired by sharing the two coefficients.

Thus, a path that provides the saved cost of hardware is searched out and then used for allocating the coefficients of the short filter to the coefficient of the long filter. But, the cost of the shared coefficients must be determined in order to calculate the saved cost of hardware. To determine the cost of the shared structure, a method of matching resources having a same pattern is considered.

FIG. 11 illustrates a simplest coefficient sharing method, in which the coefficient $2^{-2}+2^{-4}+2^{-6}$ of the short filter and the coefficient $2^{-3}+2^{-5}+2^{-7}$ of the long filter implemented only with shift 1101 and summator 1102 are represented by one coefficient.

More specifically, a multiplexer 1103 is used so that the implementation controller can select a coefficient according to whether short and long filters are used. If the coefficients of the two filters are matched, then the use of the multiplexer 1103 is not necessary, substantially reducing the hardware.

In FIG. 11, there is no shift 1101 common to the two coefficients. Generally, sharing k shifts leads to the reduction of k summators. The combination of FIG. 11 is a combination of cutting branches off during a searching of the trellis.

With the combination of FIG. 12, a 7-bit shift 1201, $2^{-7}$ is shared to save one summator. In this manner, sharing the shift 1201 of the same type reduces the number of summators to be used. The total cost of hardware of the system can be reduced only if a large number of summators is reduced, in spite of using an additional multiplexer 1202.

In addition to the common resource sharing method, a sub-expression sharing method can be used. Among the coefficient representations in terms of powers of 2, the most representative one, CSD (Canonical Signed Digit) coefficient representation is characterized in that there cannot be a value of "1"between two adjacent digits, i.e., a combination such as $2^{-3}+2^{-4}$ is not allowed. Generally, CSD has a tendency of generating combinations such as $2^{-i}+2^{-i+2}$ in the filter coefficient.

Hence, a method of combining two terms and one summator into a group and allocating coefficients to share the group is defined as a sub-expression sharing method.

FIG. 13 shows an example of the implementation using the sub-expression sharing method, which is the result of the sub-expression sharing method for the coefficient implementation of FIG. 12.

Namely, $2^{-4}+2^{-6}$ corresponds to the result of shifting $2^{-3}+2^{-5}$ by one column. This reduces one summator 1302 and two shifts, and adds one shift again. As a result, two summations and two shifts are saved.

The cost reducing effect increases with an increase in the accuracy of the coefficient representation, and more parts are shared as the filter has a more complicated coefficient representation. The cost of combined hardware is calculated by this method, so the total cost of hardware minus the cost of hardware for the combined coefficients is the shared quantity. From this, the numbers of summations and shifts are defined as a cost function of power or complexity, and then the total cost of hardware is defined.

Once the conditions for the trellis searching are summarized, the trellis searching is carried out to determine the final surviving branch as the coefficient of the long filter that allows allocation of the short filter. The final cost of paths represents the total saved cost of power, from which the total cost of hardware can be calculated.

This allocation method independently defines the cost of hardware in each stage, so the solution obtained from a searching of all combinations available is an optimal solution. For two or more communication standards, there is a need for using an implementation controller to sequentially apply the allocation method.

The general allocation method to be performed by the implementation controller can be summarized as follows. First, a trellis having as many stages as the length of the short filter is constructed. The trellis is presented in FIG. 10. The total cost of hardware for resource-shared implementation using the relationship between the coefficients of the two filters is subtracted from the cost of hardware for independent coefficient implementations. The result is defined as $c_i^j$ for each status of the trellis according to the method of FIG. 10. The allocation method for saving the most resources is determined with reference to the trellis. The coefficient of the long filter to which the coefficients of the short filter are to be allocated is determined from the final survivor. Based on the result, the implemented structure is determined using the method of FIGS. 2 and 3.

Figure 14:
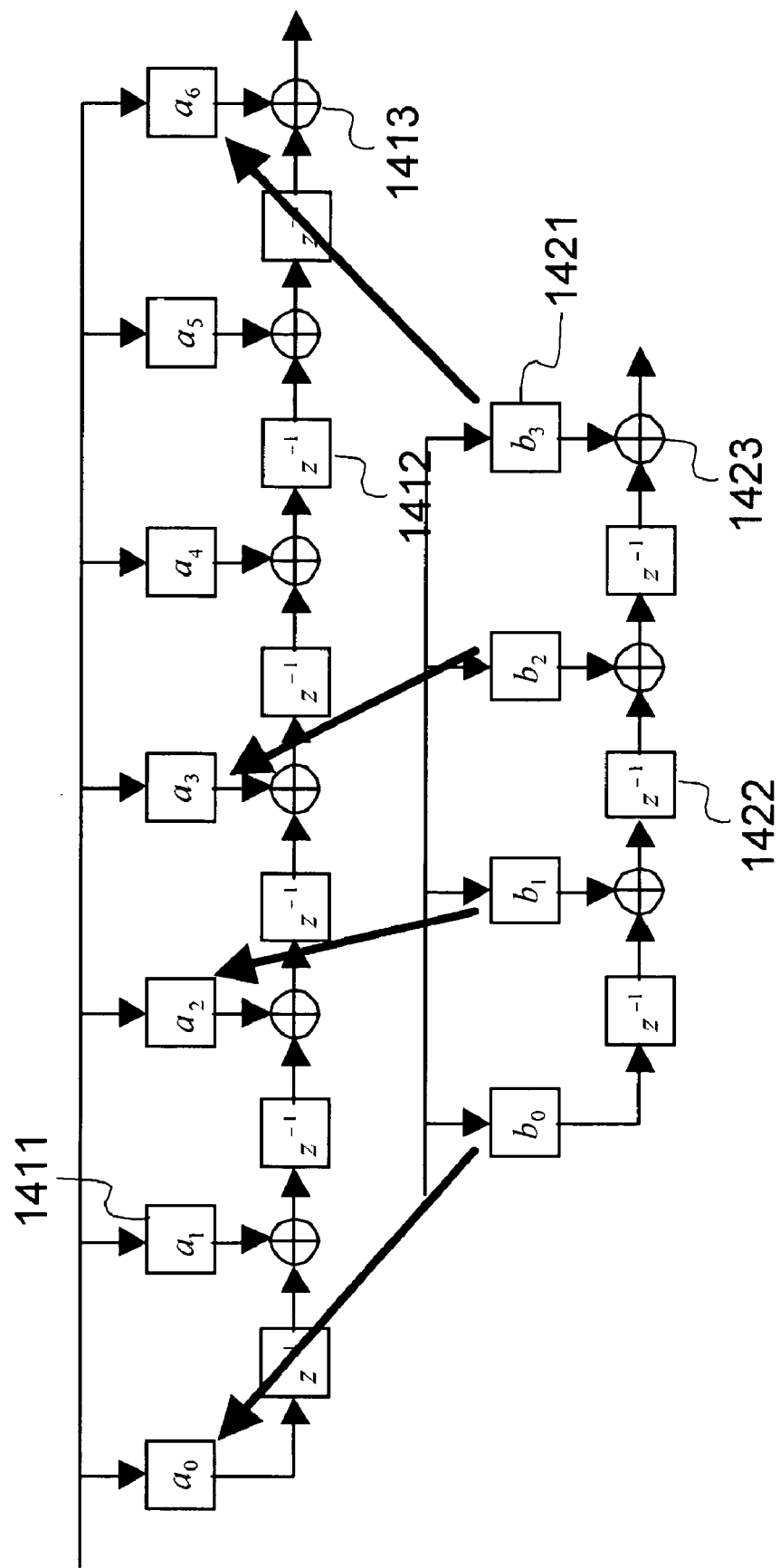
FIG. 14 is a diagram showing an example of the method for implementing a basic building block in an asymmetric form.
Figure 15:
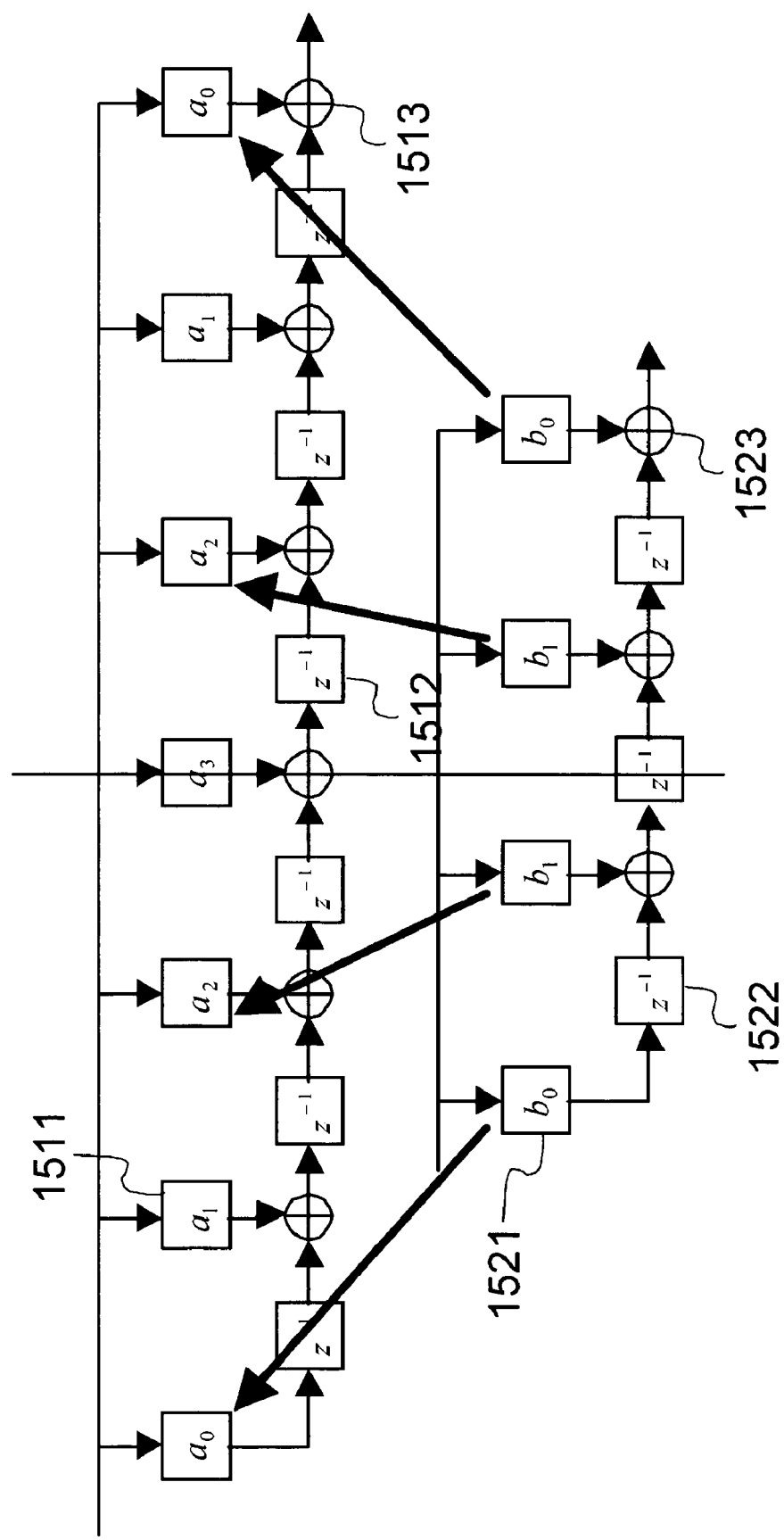
FIG. 15 is a diagram showing an example of the method for implementing a basic building block in a symmetric form.

An additional constrained condition is applied to the filter coefficient allocation to be performed by the implementation controller, thereby simplifying the implementation. For a linear phase FIR filter of which the coefficient structure is symmetric, the coefficient allocation can be performed only for half the coefficients. An example of this method is illustrated in FIGS. 14 and 15.

In addition, the structure suggested in the present invention includes the filter coefficient calculator 305 of FIG. 3. The filter coefficient calculator, which is an essential factor for constructing a complete SDR receiver, can be considered as a part of the system constituting a self-adaptive physical layer environment to transform the physical layer such as a terminal according to an instruction received from an external network.

Upon externally receiving an instruction, the implementation controller 308 of the present invention sends each specification to the filter coefficient calculator designing linear phase transmitter/receiver filters, and receives a corresponding filter coefficient calculated for the specification. Here, the filter coefficient calculator uses a calculation method based on the linear optimization method.

The linear optimization method refers to a method for solving a problem under a constrained condition that is defined as a linear simultaneous equation. The mixed integer linear programming (hereinafter, referred to as "MILP") is used for finding the solution of a linear optimizing problem under a constrained condition that the solution should be an integer.

Each coefficient of the digital filter that consists of summations and differences of power-of-2 coefficients can be linearized. However, transmitter and receiver filters are provided in one pair under the condition that the convolution of the two filters should not cause an interference for adjacent signals. This problem is optimizing the convolution of the solution of the linear problem, and a method of solving the linear optimizing problem such as MILP cannot be applied directly to this problem.

MILP is advantageous in that an optimal solution is given, so a modification of MILP offers a method of acquiring sub-optimized filter coefficients. The method of the present invention includes an optimization in two steps, which involves an optimization for the design of the transmitter filter and the receiver filter, respectively.

The frequency size response of the linear phase FIR filter g(n) can be expressed by the following equation.

$$G(\omega) = g\left(\frac{M}{2}\right) + \sum_{k=0}^{\frac{M}{2}-1} 2g(k)\cos\omega k \quad \text{[Equation 2]}$$

In the linear programming using this linear equation, the following equation can be obtained.

$$\text{Min}\delta + W_{ISI} D'_{ISI} \quad \text{[Equation 3]}$$

$$|G_R(\omega_k) - G_d(\omega_k)| \le W(\omega_k)\delta,$$

$$\omega_k = \frac{\pi k}{N_g} \quad k = 1, 2, \ldots, N_g$$

$$D'_{ISI} = \sum_{k=0}^{\lfloor\frac{M-1}{2L}\rfloor} |h(kL)|, \quad h(n) = \sum_{k=0}^{n} g_T(k)g_R(n-k),$$

-continued $$G_R(\omega) = g_R\left(\frac{M}{2}\right) + \sum_{k=0}^{\frac{M}{2}-1} 2g_R(k)\cos\omega k$$

where $N_g$ is the number of scale frequencies; M is the order of the filter; L is the over-sampling rate; $g_T(n)$ is the coefficient of the transmitter filter; and $g_R(n)$ is the coefficient of the receiver filter.

Next, an integer condition is assigned to the filter coefficients. As $g_R(n)$ is a parameter to be calculated and expressed as a summation of power-of-2 coefficients, an integer condition is applied to $g_R(n)$. There are two methods of applying the integer condition to the coefficients. One can be defined by the following equation.

$$g_R(n) = \frac{a_n}{2^M}, \quad \text{for } -2^N \le a_n \le 2^N, a_N \in Z \quad \text{[Equation 4]}$$

where M is the lowest digit for binary representation, in which case all the coefficients expressed with M bits are multiples of $2^{-M}$ and $\alpha_n$ must be an integer. A desired range of $g_R(n)$ is determined, while varying N.

The other method involves predetermining a set of values allowed for $g_R(n)$ and selecting one value in the set. This can be formulated according to the following equation.

$$S_n = \{x \mid x \in \text{binary representation allowed for } g_R(n)\} \quad \text{[Equation 5]}$$

$$= \{x_1^n, x_2^n, \ldots, x_K^n\}$$

$$g_R(n) = x_1^n \delta_1^n + x_2^n \delta_2^n + \cdots + x_K^n \delta_K^n$$

$$\sum_{i=0}^{K} \delta_i^n = 1, \quad \delta_i^n = \{0, 1\}$$

By using the method of the equation 5, the linear programming problem becomes a 0-1 knapsack problem applicable to all types of binary representations.

For the equation 3 of which h(n) is not under the linear constrained condition, the problem cannot be solved by the linear programming. In the present invention, $g_T(n)$ is not a variable. A substitution of the filter coefficients determined as consecutive coefficients offers a representation of the condition for h(n) as a linear combination, thus making the problem soluble by the linear programming.

The equation 3 can be formulated by the mixed integer linear programming as the following equation 6. Once the solution of the equation 6 is obtained, the value of $g_R(n)$ is determined. This value is substituted into the equation 6, and $g_T(n)$ remains as a variable. Then the solution of the mixed integer linear programming is obtained again so as to determine $g_T(n)$. This procedure is repeated until the final coefficient of the filter is determined.

$$\text{Min}\delta + W_{ISI} D'_{ISI} \quad \text{[Equation 6]}$$

$$|G_R(\omega_k) - G_d(\omega_k)| \le W(\omega_k)\delta, \quad \omega_k = \frac{\pi k}{N_g} \quad k = 1, 2, \ldots, N_g$$

-continued $$D'_{ISI} = \sum_{k=0}^{\lfloor \frac{M-1}{2L} \rfloor} |h(kL)|,$$

$$h(n) = \sum_{k=0}^{n} g_T(k)g_R(n-k),$$

$$G_R(\omega) = g_R\left(\frac{M}{2}\right) + \sum_{k=0}^{\frac{M}{2}-1} 2g_R(k)\cos\omega k$$

$$g_R(n) = x_1^n \delta_1^n + x_2^n \delta_2^n + \ldots + x_K^n \delta_K^m$$

$$\sum_{i=0}^{K} \delta_i^n = 1, \delta_i^n = \{0, 1\}$$

In this manner, the digital filter for a SDR system, the digital intermediate frequency signal processing apparatus having the digital filter, and a method thereof according to the present invention sets an IF band four times as high as a baseband frequency to simplify the structure of the digital intermediate frequency mixer, and uses a method of sharing resources of a given filter according to the respective communication standards by a trellis searching to reduce the total cost of hardware.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The digital filter for a SDR system, the digital intermediate frequency signal processing apparatus having the digital filter, and a method thereof according to the present invention not only simplify the structure of the digital frequency mixer, but also reduce the total cost of hardware.

The sharable part is used in common for the respective standards, the other part is selected by a multiplexer, and the coefficient is determined by a method of reducing the total cost of hardware, thus reducing the total power consumption.

The use of a trellis searching as a resource allocation method not only allows the implementation controller to easily implement resource allocation in software, but also to calculate an optimal solution in all cases.

Furthermore, upon receiving an external instruction, the implementation controller is allowed to directly calculate the coefficient of the filter according to the instruction, thereby facilitating the support of a standard newly suggested.

What is claimed is:

1. A software-defined radio system comprising:
a plurality of digital frequency mixers for, upon receiving a digitalized intermediate frequency signal, convening the received intermediate frequency signal to a baseband signal;
a receiver filter for removing a high-band signal from the convened baseband signal, each digital frequency mixer is associated with different radio frequencies (RF) for multiple communication standards associated with different RF and different bandwidths;
a receiver filter building block for controlling implementation of the receiver filter to support the multiple communication standards, the receiver filter building block including a first multiplexer for supporting filter coefficients for the multiple communication standards simultaneously, and a second multiplexer only used for inconsecutive long filter coefficients;
an implementation controller for controlling implementation of the receiver filter building block; and
a filter coefficient calculator for receiving information about a specification of the receiver filter from the implementation controller, calculating a coefficient of the receiver filter using the received information, and providing the calculated coefficient of the receiver filter to the implementation controller,
wherein a digital intermediate frequency signal is processed in the software-defined radio system, which is driven by software, the receiver filter building block controls the implementation of the receiver filter to make the receiver filter share common resources for the multiple communication standards, and select additionally required resources for each communication standard other than the shared resources by a switching operation, the additionally required resources including an additional filter coefficient multiplier and an additional register corresponding to an order of an additional filter function.

2. The apparatus as claimed in claim 1, further comprising:
a radio frequency (RF) signal processor for converting an externally received signal to an analog intermediate frequency signal; and
an analog-to-digital converter for converting the analog intermediate frequency signal to a digital intermediate frequency signal, and sending the converted digital intermediate frequency signal to the digital frequency mixer.

3. The apparatus as claimed in claim 1, wherein the receiver filter building block designs the receiver filter as a finite impulse response filter having a discrete coefficient so as to make the receiver filter reconfigurable.

4. The apparatus as claimed in claim 3, wherein the receiver filter building block makes the coefficients of the receiver filter comprised of summations or differences of power-of-2 terms, shares shift and summation resources of a common coefficient, and implements all coefficients, apart from the communication standard caused by an addition of a shift or a summation.

5. The apparatus as claimed in claim 4, wherein the receiver filter comprises:
a filter coefficient multiplier for multiplying the coefficients of the receiver filter; a register corresponding to an order of the receiver filter;
a summator for performing an operation of the receiver filter.

6. The apparatus as claimed in claim 5, wherein the first multiplexer selects implementation of the receiver filter for one of the multiple communication standards according to an instruction of the implementation controller.

7. The apparatus as claimed in claim 6, wherein the receiver filter uses the first multiplexer to reduce hardware, when the short receiver filter does not need to use the register.

8. The apparatus as claimed in claim 2, wherein the implementation controller constructs a trellis defining, as a cost, a saved quantity of hardware caused by shared resources after matching the short filter to the long filter, the trellis defining each status as a coefficient of the long filter having the short filter allocatable thereto.

9. The apparatus as claimed in claim 8, wherein the implementation controller eliminates an allocation method not maximizing a resource sharing, when resource allocation searching is performed for the constructed trellis.

10. The apparatus as claimed in claim 9, wherein the implementation controller distributes the resources of the coefficient of the receiver filter by dynamic programming based on the constructed trellis.

11. The apparatus as claimed in claim 10, wherein when the receiver filter is a linear phase finite impulse response filter, the implementation controller performs trellis searching for half the coefficients of the linear phase finite impulse response filter, and allocates the rest of the coefficients in a mirror image of the searching result.

12. The apparatus as claimed in claim 2, wherein the filter coefficient calculator externally receives information about the specification of the receiver filter, or calculates the coefficient of the filter adequate to a corresponding standard.

13. The apparatus as claimed in claim 12, wherein the filter coefficient calculator represents values allowed for each coefficient of the receiver filter as a linear combination, and calculates the coefficient of the receiver filter by linear programming for the linear combination.

14. The apparatus as claimed in claim 1, wherein the intermediate frequency is four times as high as the baseband frequency.

15. A digital filter comprising:
   a first multiplexer for supporting filter coefficients for multiple communication standards having different radio frequencies and different bandwidths simultaneously;
   a second multiplexer only used for inconsecutive long filter coefficients;
   a filter coefficient multiplier for multiplying the coefficients; a register corresponding to an order; and
   a summator for performing an operation, the digital filter being constructed to share common resources according to the multiple communication standards, and select additionally required resources other than the shared resources by a switching operation,
wherein the additionally required resources including an additional filter coefficient multiplier and an additional register corresponding to an order of an additional filter function, the digital filter shares the common resources by including a resource for setting a filter having a relatively small length in a resource for setting a filter having a largest length, and the digital filter operates in a digital intermediate frequency signal processing device in a software-defined radio.

16. The digital filter as claimed in claim 15, wherein the digital filter implements a corresponding coefficient with an external input or an internal filter coefficient calculator.

17. A method for processing a digital intermediate frequency signal comprising:
   (a) converting a digitalized intermediate frequency signal to a baseband signal, upon receiving the intermediate frequency signal;
   (b) removing a high-band signal from the converted baseband signal;
   (c) controlling implementation of a receiver filter performing (b) to support multiple communication standards having different radio frequencies and different bandwidths;
   (d) calculating a coefficient of the receiver filter using information about a specification of the receiver filter, upon receiving the information from an implementation controller for controlling implementation of a receiver filter building block performing (c); and
   (e) providing the calculated coefficient of the receiver filter to the implementation controller,
wherein the digital intermediated frequency signal is processed in a software-defined radio system, which is driven by software, and (c) comprises:
   sharing common resources according to the multiple communication standards by including a resource for setting a receiver filter having a relatively small length in a resource for setting a receiver filter having a relatively small length in a resource for setting a receiver filter having a longest length;
   selecting additionally required resources for each communication standard by a switching operation, the additionally required resources including an additional filter coefficient multiplier and an additional register corresponding to an order of an additional filter function, and
   combining inconsecutive coefficients of the receiver filter having the longest length to which coefficients for two consecutive orders of the receiver filter having a relatively small length are allocated.

18. The method as claimed in claim 17, wherein (d) comprises:
   defining, as a cost, a saved quantity of hardware caused by the shared resources when matching the short receiver filter to the long receiver filter; and
   constructing a trellis defining each status as a coefficient of the long receiver filter having the short receiver filter allocatable thereto.

19. The method as claimed in claim 18, wherein (d) comprises:
   distributing the resources of the coefficients of the receiver filter by dynamic programming based on the trellis.

20. The method as claimed in claim 19, wherein (d) comprises: externally receiving information about a specification of the receiver filter; and calculating the coefficient of the receiver filter based on the input information.

* * * * *